United States Patent
Brizard et al.

(10) Patent No.: US 9,513,394 B2
(45) Date of Patent: Dec. 6, 2016

(54) ACTIVELY CONTROLLED BUOY BASED MARINE SEISMIC SURVEY SYSTEM AND METHOD

(71) Applicant: CGGVERITAS SERVICES SA, Massy (FR)

(72) Inventors: Thierry Brizard, Massy (FR); Jean-Paul Gruffeille, Les Molieres (FR)

(73) Assignee: CGG SERVICES SA, Massy (FR)

( * ) Notice: Subject to any disclaimer, the term of this patent is extended or adjusted under 35 U.S.C. 154(b) by 615 days.

(21) Appl. No.: 14/000,728

(22) PCT Filed: Jan. 18, 2013

(86) PCT No.: PCT/EP2013/050960
§ 371 (c)(1),
(2) Date: Aug. 21, 2013

(87) PCT Pub. No.: WO2013/107872
PCT Pub. Date: Jul. 25, 2013

(65) Prior Publication Data
US 2013/0329519 A1 Dec. 12, 2013

Related U.S. Application Data

(60) Provisional application No. 61/588,741, filed on Jan. 20, 2012, provisional application No. 61/619,013, filed on Apr. 2, 2012.

(51) Int. Cl.
*B63B 22/02* (2006.01)
*G05D 1/02* (2006.01)
(Continued)

(52) U.S. Cl.
CPC ............. *G01V 1/3835* (2013.01); *B63B 22/02* (2013.01); *B63B 22/18* (2013.01); *G01V 1/3817* (2013.01);
(Continued)

(58) Field of Classification Search
CPC .................................. G01V 1/18; G01V 1/38
See application file for complete search history.

(56) References Cited

U.S. PATENT DOCUMENTS

| 4,992,992 A | 2/1991 | Dragoset, Jr. |
| 5,077,696 A | 12/1991 | McEachern et al. |

(Continued)

FOREIGN PATENT DOCUMENTS

| EP | 1 217 390 A1 | 6/2002 |
| WO | 2011106237 A2 | 9/2011 |

OTHER PUBLICATIONS

"Argo (oceanography)," Wikipedia, 2014, downloaded Sep. 16, 2014 from http://en.wikipedia.org/wiki/Argo_(oceanography), pp. 1-4.

(Continued)

*Primary Examiner* — Krystine Breier
(74) *Attorney, Agent, or Firm* — Patent Portfolio Builders PLLC

(57) ABSTRACT

A buoy for recording seismic signals while underwater. The buoy includes a body; a buoyancy system configured to control a buoyancy of the body to descend to a predetermined depth (H1); a propulsion system configured to actively adjust a position of the body at a given position (X, Y); a seismic sensor located on the body and configured to record the seismic signals; and a control device configured to control the buoyancy system to maintain the body substantially at the predetermined depth (H1) and to control the propulsion system to maintain the body substantially at the (Continued)

given position (X, Y) while the buoy records seismic data, and also to instruct the seismic sensor when to record seismic signals.

18 Claims, 17 Drawing Sheets

(51) Int. Cl.
    *G01V 1/38*     (2006.01)
    *B63B 22/18*     (2006.01)
    *B63B 22/00*     (2006.01)
    *G01V 1/18*     (2006.01)

(52) U.S. Cl.
    CPC .......... *B63B 2022/006* (2013.01); *G01V 1/186* (2013.01); *G01V 1/3843* (2013.01)

(56) References Cited

U.S. PATENT DOCUMENTS

| | | |
|---|---|---|
| 5,691,957 A | 11/1997 | Spiesberger |
| 5,894,450 A * | 4/1999 | Schmidt ................ H04B 13/02 367/131 |
| 6,493,636 B1 | 12/2002 | DeKok |
| 6,618,321 B2 | 9/2003 | Brunet |
| 6,625,083 B2 | 9/2003 | Vandenbroucke |
| 6,758,157 B2 | 7/2004 | Grieger et al. |
| 6,775,618 B1 | 8/2004 | Robertsson et al. |
| 6,932,185 B2 | 8/2005 | Bary et al. |
| 7,176,589 B2 | 2/2007 | Rouquette |
| 7,376,045 B2 | 5/2008 | Falkenberg et al. |
| 7,417,924 B2 * | 8/2008 | Vigen .................. G01V 1/3835 367/129 |
| 7,987,805 B1 | 8/2011 | Buescher et al. |
| 2002/0110048 A1 | 8/2002 | Vandenbroucke |
| 2007/0064526 A1 * | 3/2007 | Holo ................... G01V 1/3826 367/15 |
| 2008/0192569 A1 | 8/2008 | Ray et al. |
| 2011/0266086 A1 | 11/2011 | Welker et al. |
| 2012/0020185 A1 * | 1/2012 | Welker ................. G01V 1/3843 367/16 |
| 2013/0081564 A1 * | 4/2013 | Brizard .................. B63B 27/36 114/259 |

OTHER PUBLICATIONS

Bellingham et al., "A Small, Lone-Range Autonomous Vehicle for Deep Ocean Exploration", Proceedings of the Second (1992) International Offshore and Polar Engineering Conference, San Francisco, USA, 14.19 Jun. 1992, pp. 461-467.

Bogue et al., "SOAR Range Validation Test: Autonomous Buoyancy-Driven Gliders, Autonomous Surface Vehicles, and Autonomous Profiling Floats", Office of Naval Research, Jan. 3-9, 2011, pp. 1-26.

PCT ISR and WO mailed Jun. 24, 2013 in related International Application No. PCT/EP2013/050957.

PCT ISR and WO mailed Jun. 24, 2013 in related International Application No. PCT/EP2013/050958.

PCT ISR and WO mailed Jun. 24, 2013 in related International Application No. PCT/EP2013/050960.

Patent Examination Report in corresponding Australian Application No. 2013210968 dated Nov. 20, 2015.

Communication pursuant to Article 94(3) EPC in related European Application No. 13701952.7, dated Apr. 28, 2015.

Non-Final U.S. Office Action in related U.S. Appl. No. 13/736,342 dated Apr. 23, 2014.

Non-Final U.S. Office Action in related U.S. Appl. No. 13/736,342 dated Aug. 7, 2014.

Notice of Panel Decision from Pre-Appeal Brief Review in related U.S. Appl. No. 13/736,342 dated Dec. 10, 2014.

Examiner's Answer to Appeal in related U.S. Appl. No. 13/736,342 dated Jun. 12, 2015.

* cited by examiner

ACTIVELY CONTROLLED BUOY BASED MARINE SEISMIC SURVEY SYSTEM AND METHOD

CROSS-REFERENCE TO RELATED APPLICATIONS

The present application is related to and claims the benefit of priority of U.S. Provisional Application Ser. No. 61/588,741, filed on Jan. 20, 2012, having the title "Method and System For Marine Seismic Survey," and U.S. Provisional Application Ser. No. 61/619,013, filed on Apr. 2, 2012, having the title "Marine Acquisition Using Subaquatic Seismic Nodes," the entire contents of which are incorporated herein by reference.

BACKGROUND

Technical Field

Embodiments of the subject matter disclosed herein generally relate to methods and systems and, more particularly, to mechanisms and techniques for performing a marine seismic survey using buoys that carry appropriate seismic sensors.

Discussion of the Background

Marine seismic data acquisition and processing generate a profile (image) of geological structures under the seafloor. While this profile does not provide an accurate location of oil and gas reservoirs, it suggests, to those trained in the field, the presence or absence of these potential reservoirs. Thus, providing a high-resolution image of the geological structures under the seafloor is an ongoing process.

Reflection seismology is a method of geophysical exploration for determining properties of earth's subsurface, which is especially helpful in the oil and gas industry. Marine reflection seismology is based on using a controlled source of energy that sends the energy into the earth. By measuring the time it takes for the reflections to come back to plural receivers, it is possible to evaluate the depth of features causing such reflections. These features may be associated with subterranean hydrocarbon deposits.

A traditional system for generating the seismic waves and recording their reflections off the geological structures present in the subsurface is illustrated in FIG. 1. A vessel 10 tows an array of seismic receivers 11 provided on streamers 12. The streamers may be disposed horizontally, i.e., lying at a constant depth relative to the surface 14 of the ocean. The streamers may be disposed to have other than horizontal spatial arrangements. The vessel 10 also tows a seismic source array 16 configured to generate a seismic wave 18. The seismic wave 18 propagates downward toward the seafloor 20 and penetrates the seafloor until eventually a reflecting structure 22 (reflector) reflects the seismic wave. The reflected seismic wave 24 propagates upward until it is detected by the receiver 11 on the streamer 12. Based on the data collected by the receiver 11, an image of the subsurface is generated by further analyses of the collected data.

However, this traditional configuration is expensive because of the high costs associated with operating the towing vessel and the streamers. In addition, the data produced by the receivers of the streamers is poor due to the flow noise produced by the movement of the streamers in water. Further, the notch diversity of the data recorded with the streamers might be limited. To overcome some of these problems, new technologies deploy seismic sensors on the bottom of the ocean (ocean bottom stations, OBS) to achieve a coupling with the ocean bottom and to reduce the noise. Even so, positioning the seismic sensors remains a challenge for OBS technology.

Other technologies use permanent receivers set on the sea bottom, as disclosed in U.S. Pat. No. 6,932,185 (herein '185), the entire content of which is incorporated herein by reference. In this case, the seismic sensors 60 are attached, as shown in FIG. 2 (which corresponds to FIG. 4 of the '185), to a heavy pedestal 62. A station 64 that includes the sensors 60 is launched from a vessel and arrives, due to its gravity, at a desired position. The station 64 remains on the bottom of the ocean permanently. Seismic data recorded by sensors 60 is transferred through a cable 66 to a mobile station 68. When necessary, the mobile station 68 may be brought to the surface to retrieve the seismic data.

Although this method provides a good coupling between the ocean bottom and the seismic receivers, the process is still expensive and not flexible because the stations and corresponding sensors are difficult to move around or reuse. Further, positioning the stations is not straightforward. Furthermore, the notch diversity is not greatly improved.

An improvement to this method is described, for example, in European Patent No. EP 1 217 390 (herein '390), the entire content of which is incorporated herein by reference. In this document, a receiver 70 is removably attached to a pedestal 72 together with a memory device 74 as illustrated in FIG. 3. After recording the seismic signals, the receiver 70 and the memory device 74 are instructed by a vessel 76 to detach from the pedestal 72 and to surface at the ocean surface 78 to be picked up by the vessel 76.

However, this configuration is not very reliable because the mechanism maintaining the receiver 70 connected to the pedestal 72 may fail to release the receiver 70. Also, the receiver 70 and pedestal 72 may not reach their intended positions on the seabed. Further, the fact that the pedestals 72 are left behind increases ocean pollution and the survey price, which is undesirable.

Thus, it can be seen from the above approaches that a characteristic of the existing methods is to record seismic signals either (i) close to the surface, with streamers, or (ii) at the seabed with OBS. Neither situation offers the desired notch diversity.

Accordingly, it would be desirable to provide systems and methods that provide an inexpensive and reliable device for recording seismic signals with good notch diversity.

SUMMARY

According to an exemplary embodiment, there is a seismic survey system for recording seismic data underwater in the presence of underwater currents. The system includes first plural buoys configured to descend in water at a predetermined depth (H1), at least one buoy having a seismic receiver for recording the seismic data, a buoyancy system for maintaining the predetermined depth (H1), and a propulsion system for adjusting its horizontal position; a first vessel configured to launch the first plural buoys along a first line; and a second vessel configured to recover the first plural buoys at a second line, wherein there is a predetermined distance between the first and second lines. The first plural buoys are configured to travel underwater, at substantially the first predetermined depth (H1), from the first line to the second line, due to a combination of the underwater currents and the propulsion system.

According to another exemplary embodiment, there is a method for recording seismic data underwater in the presence of underwater currents. The method includes determining trajectories of the underwater currents based on historic data; selecting a starting line substantially perpendicular to the underwater currents; launching, along the starting line, first plural buoys from a first vessel, the first plural buoys being configured to descend in water, at least one buoy having a seismic receiver for recording the seismic data, a buoyancy system for maintaining the predetermined depth (H1), and a propulsion system for adjusting its horizontal position; selecting a finish line substantially perpendicular on the underwater currents; and retrieving, along the finish line, the first plural buoys on a second vessel, wherein there is a predetermined distance between the start and finish lines. The first plural buoys are configured to travel underwater, at substantially the first predetermined depth (H1), from the start line to the finish line, due to a combination of the underwater currents and the propulsion system.

According to still another exemplary embodiment, there is a seismic survey system for recording seismic data underwater. The system includes first plural buoys configured to descend to a first predetermined depth (H1) in water and at a given position in a plane substantially parallel with a water surface, at least one buoy having a seismic receiver for recording the seismic data; a first vessel configured to launch the first plural buoys; a second vessel configured to recover the first plural buoys; a first acoustic system attached to the first vessel and configured to detect a position of the at least one buoy while underwater; and a second acoustic system attached to the second vessel and configured to detect the position of the at least one buoy while underwater. The at least one buoy has a buoyancy system that maintains the first predetermined depth (H1) and an active propulsion system that maintains the given position underwater while recording the seismic data.

According to yet another exemplary embodiment, there is a buoy for recording seismic signals while underwater. The buoy includes a body; a buoyancy system configured to control a buoyancy of the body to descend to a predetermined depth (H1); a propulsion system configured to actively adjust a position of the body at a given position (X, Y); a seismic sensor located on the body and configured to record the seismic signals; and a control device configured to control the buoyancy system to maintain the body substantially at the predetermined depth (H1) and to control the propulsion system to maintain the body substantially at the given position (X, Y) while the buoy records seismic data, and also to instruct the seismic sensor when to record seismic signals.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
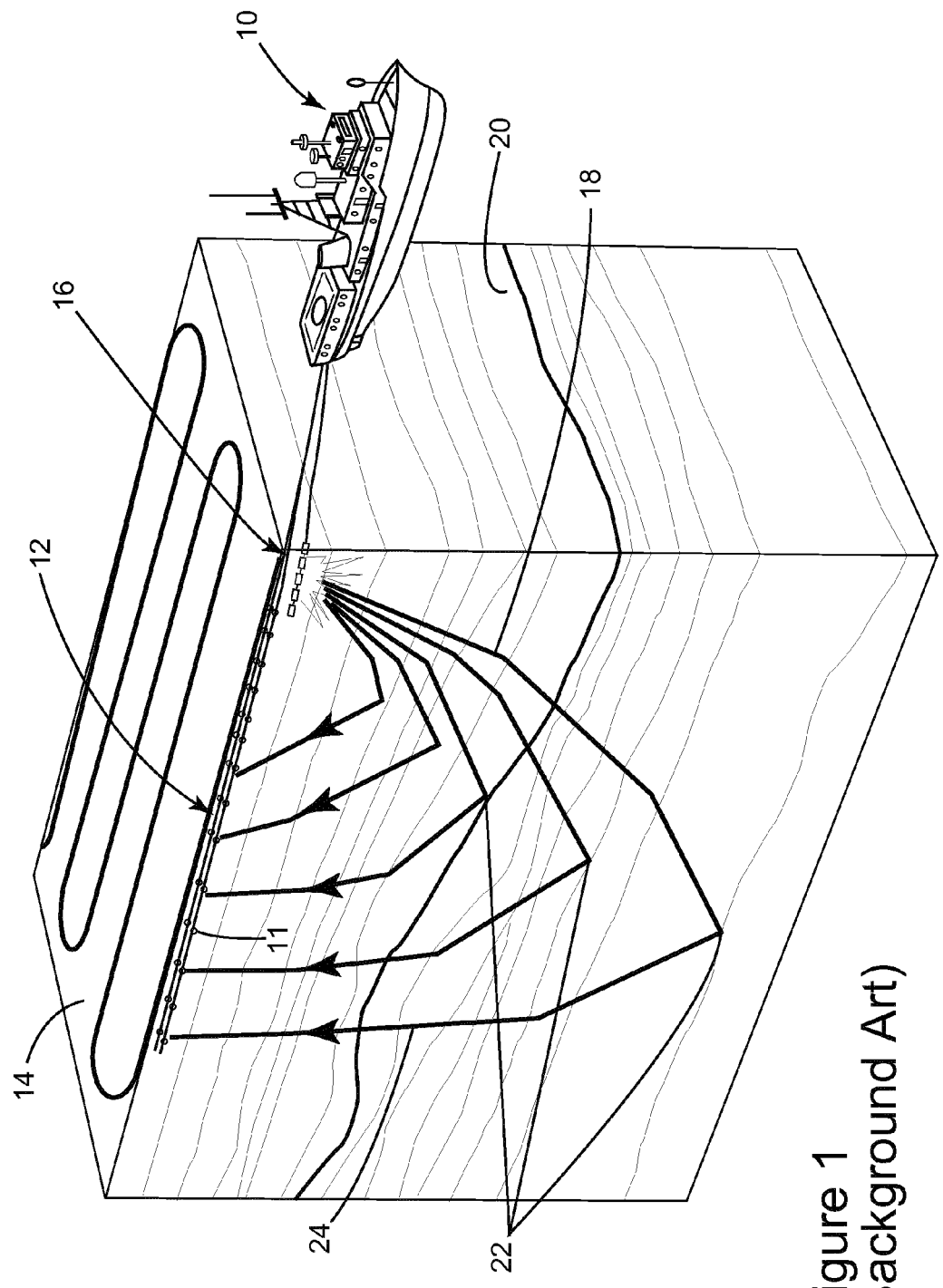
FIG. 1 is a schematic diagram of a conventional seismic survey system.
Figure 2:
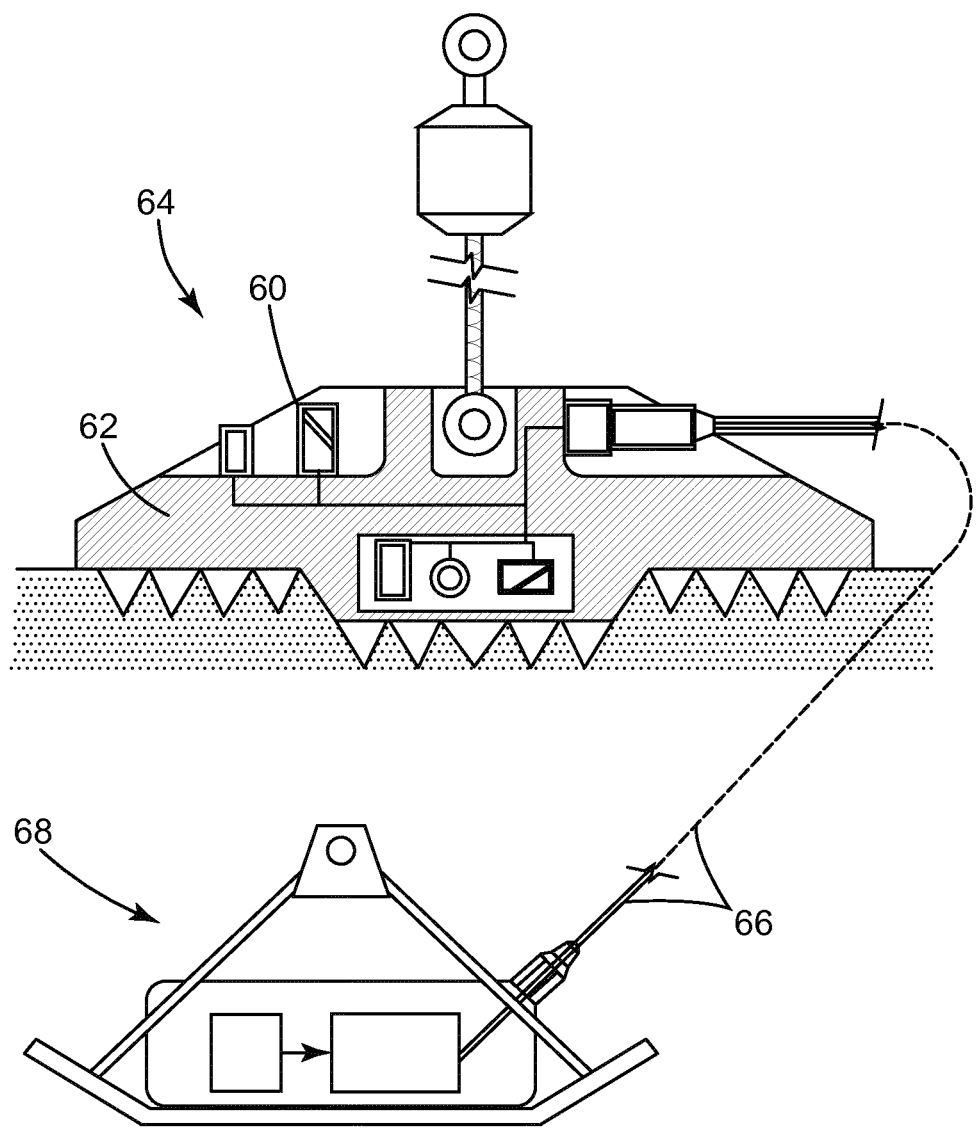
FIG. 2 is a schematic diagram of a station that may be positioned on the bottom of the ocean for seismic data recording.
Figure 3:
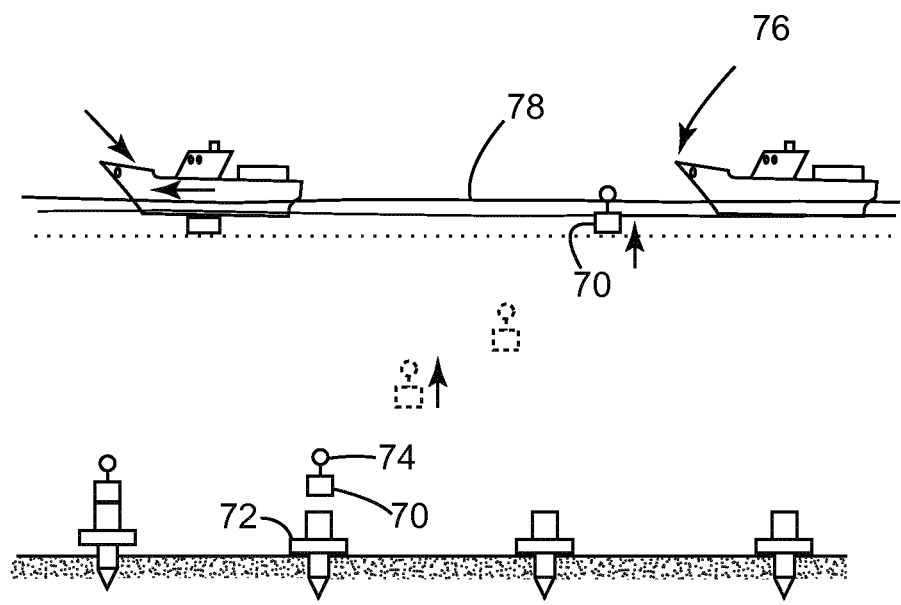
FIG. 3 is a schematic diagram of another station that may be positioned on the bottom of the ocean for seismic data recording.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a buoy having seismic sensors and being deployed from a deployment vessel. However, the embodiments to be discussed next are not limited to buoys being deployed from a vessel, but may be applied to other devices that may include seismic sensors.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

New technologies in marine seismic surveys need an inexpensive system for deploying to and recovering from the sea seismic receivers. According to an exemplary embodiment, such a seismic system includes multiple buoys, each having one or more seismic sensors. The buoys are initially stored on a launching vessel. The launching vessel launches the buoys at predetermined distances along a path of the vessel. The seismic receivers may include at least one of a hydrophone, geophone, accelerometer, electromagnetic sensor, etc. The buoys are configured to control their own buoyancy so that each buoy is capable of reaching a predetermined depth and then resurfacing on its own, when instructed. A seismic source (acoustic and/or electromagnetic) may be towed by the same vessel or another vessel. The seismic source may include plural individual sources that are distributed along a horizontal line, a variable-depth line, a curved line, a parameterized variable-depth line, etc. After performing the recording, according to an exemplary embodiment, a recovery vessel approaches the buoys, instructs them to resurface and collects them.

However, there are certain areas where the underwater currents are strong and, thus, the buoys are not stationary during the seismic survey. For this situation, the new technology takes advantage of the existing underwater currents and allows the buoys to travel underwater to follow the current's path. For this reason, the current's path (or trajectory) may be estimated before launching the buoys so it is known where to expect the buoys to arrive after a given time for collection purposes. The launching and recovery vessels may track the position of the buoys and update the current paths based on real-time measurements. The seismic receivers of the buoys are configured to record seismic signals as the buoy travels from the launching vessel to the recovery vessel. The seismic signals are time-stamped and associated with corresponding three-dimensional (3D) positions (coordinates of the buoy) where the signals were recorded.

Figure 4:
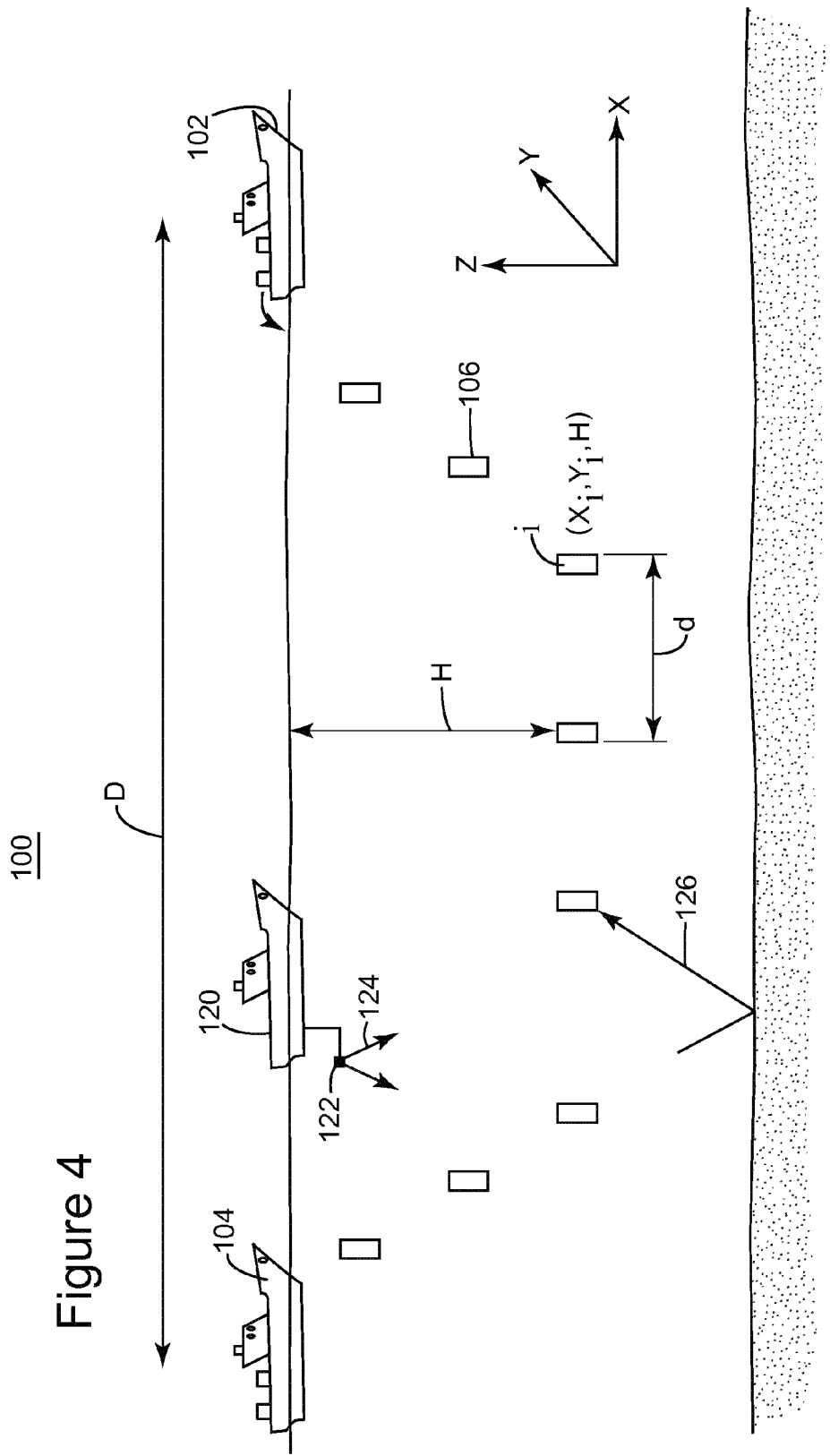
FIG. 4 is a schematic diagram of a seismic survey system that uses buoys for recording seismic data according to an exemplary embodiment.

A seismic system assumed to operate underwater with low or no water currents is now discussed in more detail according to an exemplary embodiment illustrated in FIG. 4. FIG. 4 illustrates a seismic survey system 100 that may include a launching vessel 102, a recovery vessel 104 and plural buoys 106. Both vessels 102 and 104 may act as (i) recovery or (ii) launching or (iii) recovery and launching vessels. These vessels may be small boats with a low cost of operation.

The launching vessel initially stores the plural buoys 106. When the survey is started, the launching vessel 102 launches the buoys 106 with a certain horizontal space interval d. The horizontal space interval d may be, for example, between 10 and 200 m. However, the value of the horizontal space interval may vary according to the goals of the seismic survey. The system 100 may also include one or more source vessels 120 that are configured to tow a seismic source 122. The seismic source 122 is configured to generate a seismic wave 124. A reflected seismic wave 126 is recorded by the seismic receiver of the buoy 106. The seismic receiver may include any known receiver or combination thereof.

The buoys 106 are configured to sink to a predetermined depth H and then to maintain (for example, with a buoyancy system to be described later with regard to FIG. 9) that depth until instructed to the contrary. Although the buoys can sink all the way to the ocean bottom, it is envisioned to perform seismic acquisition data with the buoys floating in the water, thus, away from the ocean bottom. The depth for the seismic survey may be between 200 and 300 m.

However, other depths may be used according to the goals of the seismic survey. Further, an $i^{th}$ buoy may be configured to reach a given position $(X_i, Y_i)$ in a plane substantially parallel with the water surface. An active propulsion system (to be discussed later with regard to FIG. 9) may be used to maintain the buoy at the given position $(X_i, Y_i, H)$ in the XY plane (see FIG. 4).

The launching vessel launches the buoys while moving along a predetermined path. The buoys, assuming that there is low or no underwater current, tend to maintain their absolute position by simply controlling their buoyancy. While recording the seismic waves, the buoys also listen for an acoustic signal from the recovery vessel that indicates that the buoy needs to resurface. Upon receiving that acoustic signal, the buoy resurfaces and it is then collected by the recovery vessel.

Figure 5:
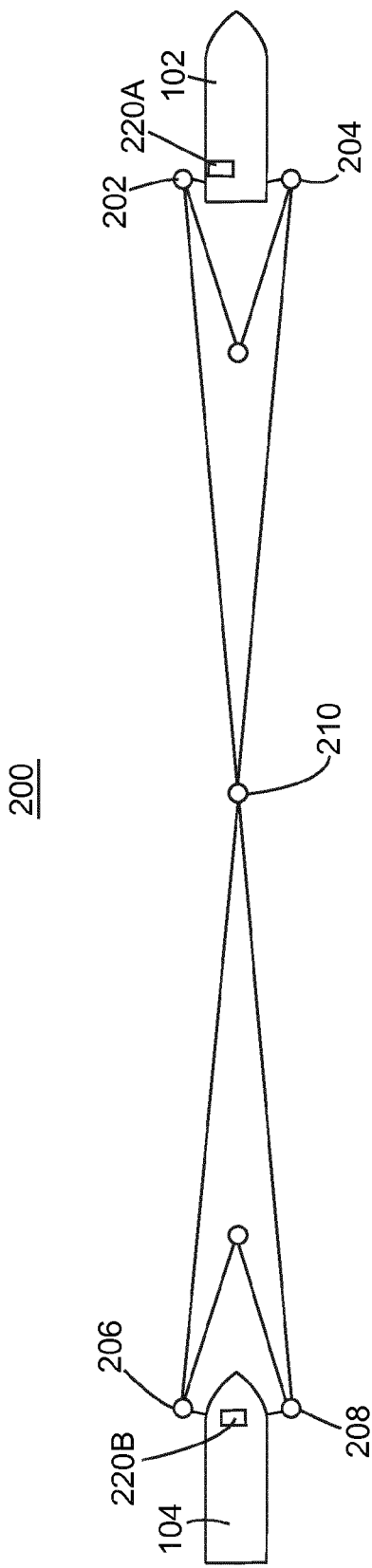
FIG. 5 is a schematic diagram of two vessels that determine an underwater position of a buoy according to an exemplary embodiment.

A distance D between the launching and recovery vessels may be in the order of kilometers, for example, 10 km. Under this scenario, as illustrated in FIG. 5, the launching vessel 102 may have two acoustic pingers 202 and 204 (that form an acoustic system) and the recovery vessel 104 may have two acoustic pingers 206 and 208. The acoustic pingers may be provided on sides of the vessels and may be configured to use their own frequencies (f1 to f4) so that a buoy 210 receives four different frequencies from the acoustic pingers. The acoustic pingers may be configured to transmit a signal, for example, every 5 seconds, with a range of 5 km. Another system for localizing the buoys is described with reference to FIG. 12.

The buoy may have an oscillator (to be discussed later) that keeps a copy of the 5-second transmitting clock. Thus, the buoy is configured to record the time of arrival of the acoustic signals from the pingers. Combining that information with the depth information given by its pressure gauge and the positions of the pingers (provided, for example, by a differential global positioning system (DGPS), and optionally by the pitch and roll of the boats), it is possible to reconstitute the absolute position of each buoy at any desired time so that the time-stamped recorded signals may be mapped to the actual positions of the buoy when the seismic signals were recorded. FIG. 5 shows control units 220A and 220B mounted on each vessel. The control units may include, in addition to the traditional processor and memory, the DGPS. Other GPS-type units may be used. The absolute position of each buoy may be calculated by the control units. The control units map traces recorded by a buoy with corresponding underwater positions of the buoy as determined by the acoustic systems.

The control units may also be distributed on the vessel and the buoy. While FIG. 5 shows the acoustic pingers mounted on two vessels, it is possible to have the acoustic pingers mounted only on a single vessel.

Thus, the plurality of buoys shown in FIGS. 4 and 5 may be imagined as the equivalent of one or more streamers (in terms of seismic data collection), but with the advantage that there is no drag on the vessels, a depth range of the buoys is much enlarged comparative with a real streamer, and a distance d between the receivers may be adjusted as desired. Also, the buoys may be instructed, before being launched from the launching vessel 204, to have various depths as illustrated in FIGS. 6 and 7.

Figure 6:
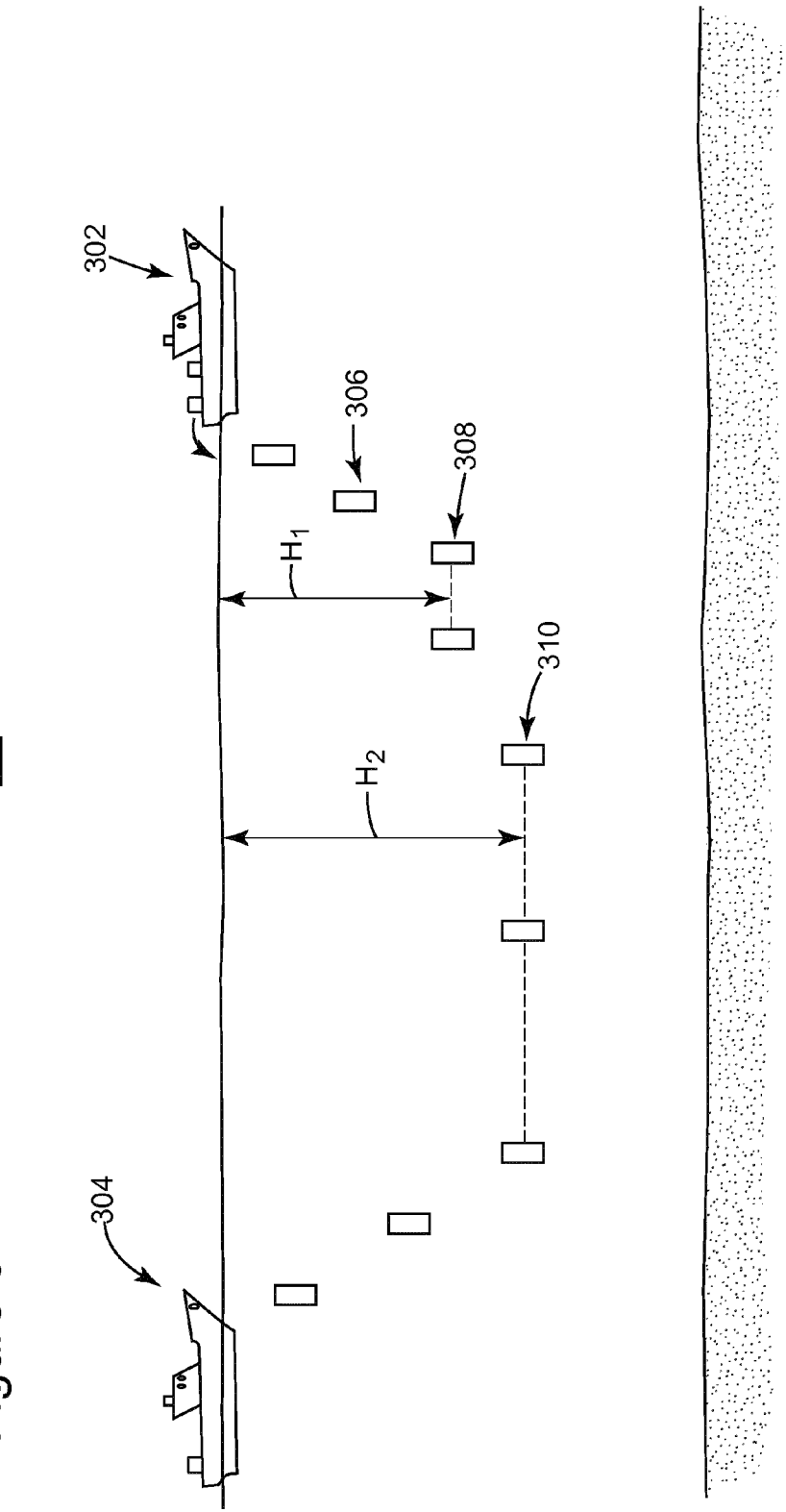
FIG. 6 is a schematic diagram of a seismic survey system that uses plural buoys distributed at various depths for recording seismic data according to an exemplary embodiment.

In this respect, FIG. 6 is a side view showing a system 300 that includes a launching vessel 302, a recovery vessel 304 and plural buoys 306. Some buoys form a first layer 308, which is located at a first depth H1, and other buoys form a second layer 310, which is located at a second depth H2, different from H1. Although FIG. 6 shows the buoys provided at only two depths, those skilled in the art would appreciate that the buoys may be provided at more than two depths.

Figure 7:
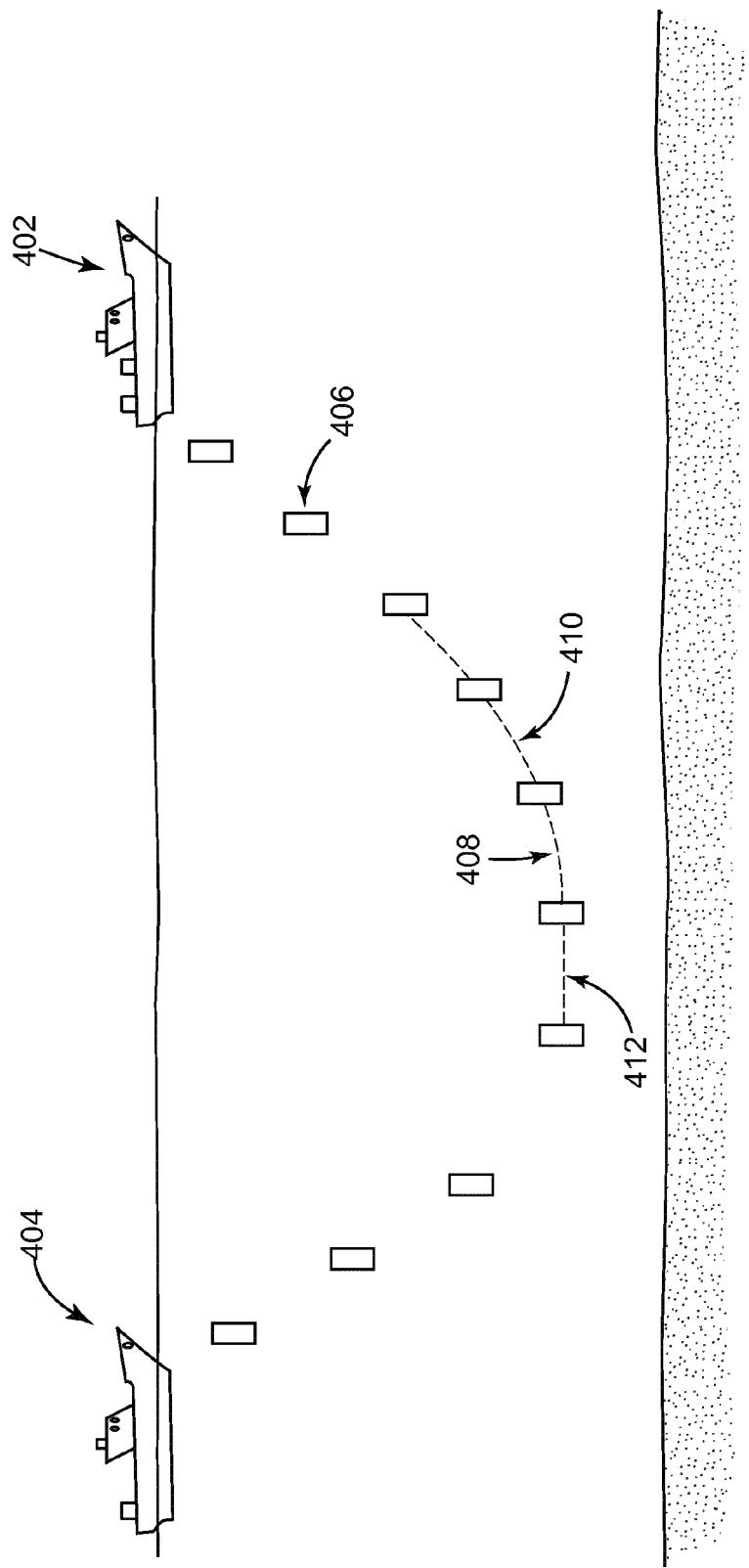
FIG. 7 is a schematic diagram of a seismic survey system that uses plural buoys distributed along a curve for recording seismic data according to an exemplary embodiment.

FIG. 7 is a side view showing a system 400 that includes a launching vessel 402, a recovery vessel 404, and plural buoys 406. The buoys are arranged in this embodiment along a curve 408. The curve 408 may be a straight line, a parameterized depth-varying curve (e.g., parabola, hyperbola, exponential, circle, etc.), or a combination of them. In the embodiment illustrated in FIG. 7, the curve 408 has a curved portion 410 and a straight line portion 412. It is noted that the buoys not distributed on the curve 408 are travelling to either reach their final underwater position (those closer to the launching vessel 402) or their surface position (those closer to the recovery vessel 404) for being recovered by the recovery vessel 404.

Figure 8:
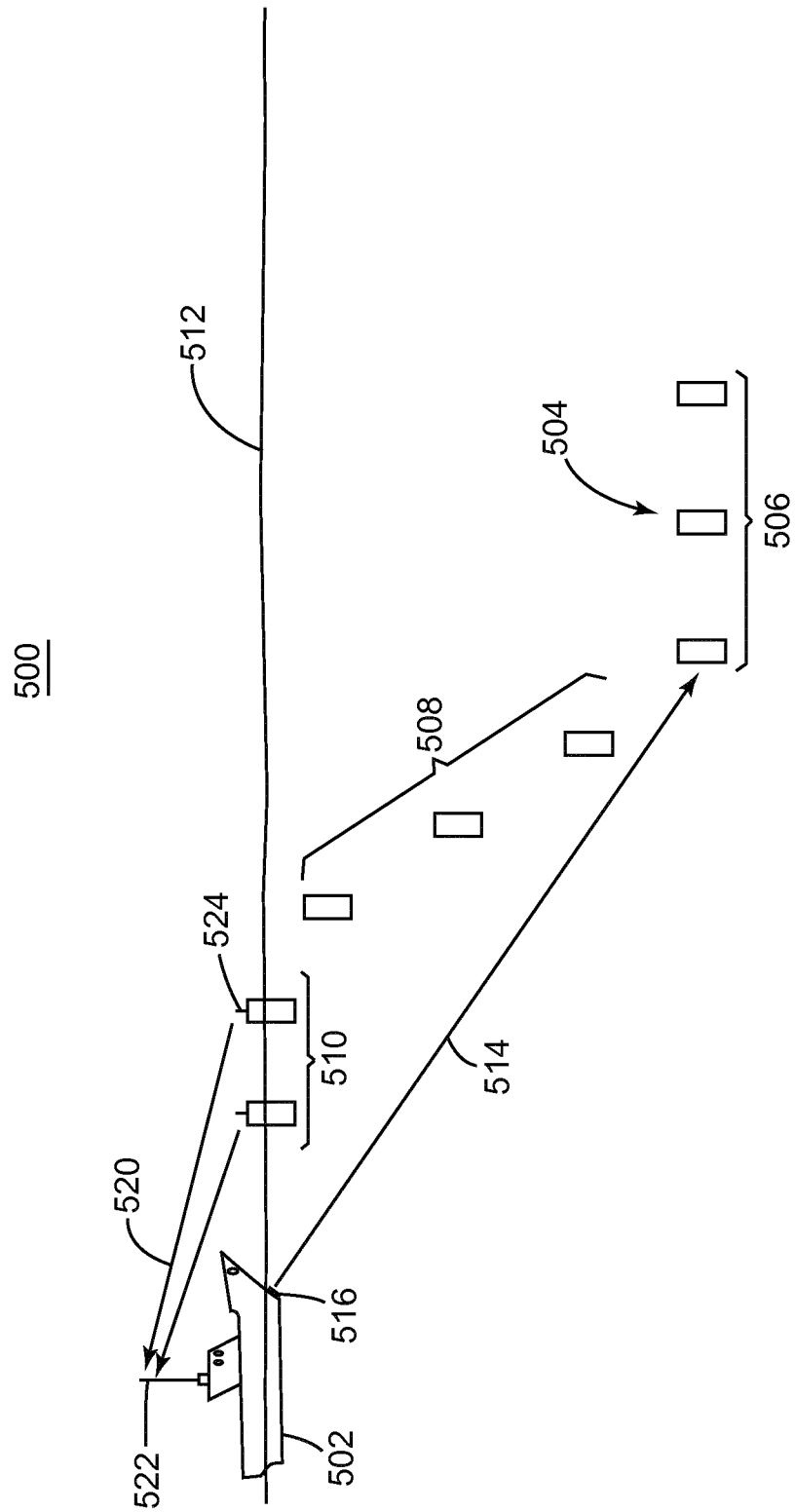
FIG. 8 is a schematic diagram of a recovery vessel that instructs various buoys to resurface for recovery according to an exemplary embodiment.

The recovery phase of the buoys is now discussed with regard to FIG. 8. FIG. 8 shows a system 500 that includes a launching vessel (not shown), a recovery vessel 502 and plural buoys 504. A set of buoys 506 is shown having a predetermined depth, while another set of buoys 508 is in the process of surfacing, and still another set of buoys 510 is already at the water surface 512 waiting to be recovered by the recovery vessel 502.

The recovery vessel generates an acoustic signal 514 with an appropriate acoustic signal generator 516. The acoustic signal 514 may have a frequency f5 different from the frequencies used by the pingers of the launching and recovery vessels. The acoustic signal 514 may be a short-range acoustic signal and constitutes a command for the buoy to surface. When a buoy receives the acoustic signal 514, the buoy activates its buoyancy system (to be discussed later) to resurface. The set of buoys 508 is in the middle of the resurfacing process. Once at the water surface, each buoy of the set of buoys 510 activates a radio-frequency (RF) beacon (transmitter) 524 for sending a signal 520 to the RF goniometer 522 of the recovery vessel 502. Thus, each buoy may have an RF transmitter 524.

Based on this information, the recovery vessel 502 determines the position of each buoy and recovers them. The recovery process may include bringing the buoys on a deck of the vessel. The structure of a buoy is now discussed with regard to FIG. 9.

Figure 9:
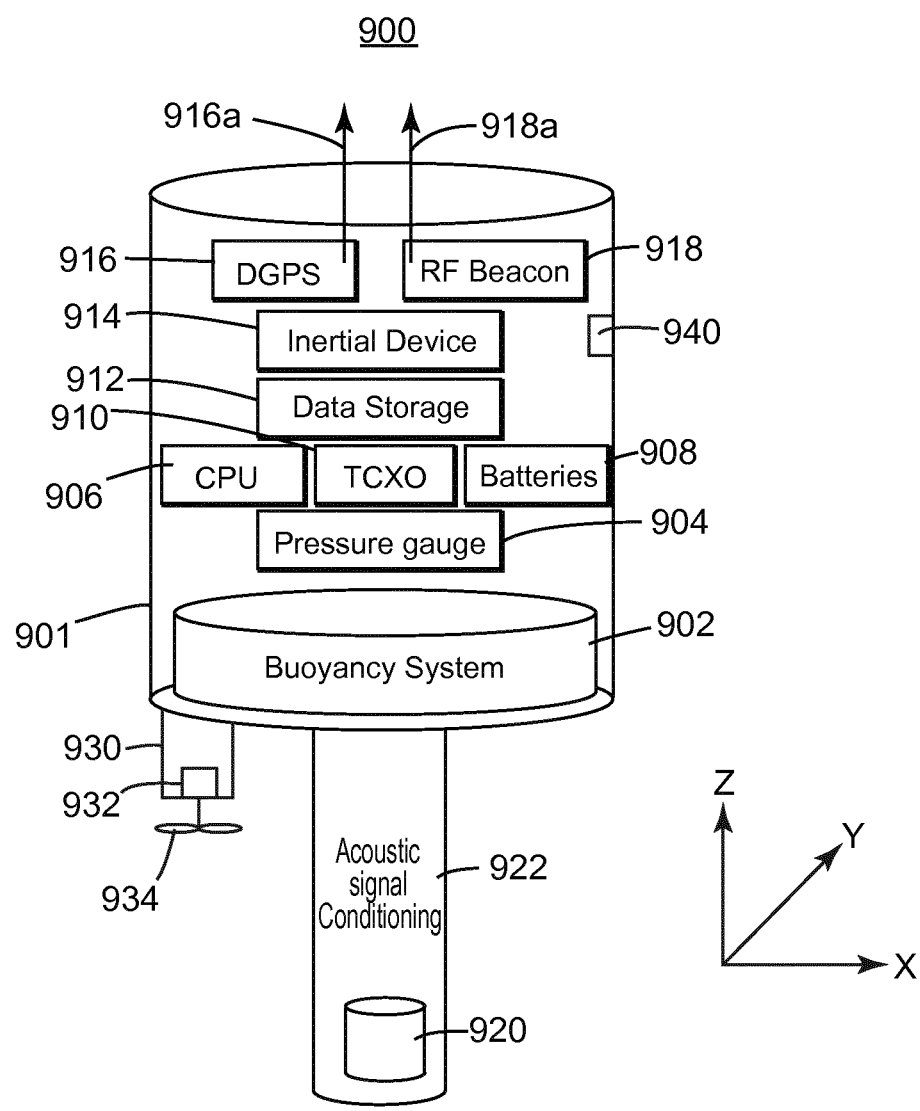
FIG. 9 is a schematic diagram of a buoy configured to record seismic signals while traveling underwater according to an exemplary embodiment.

FIG. 9 illustrates an exemplary buoy 900. The buoy 900 may have a body 901 that includes a buoyancy system 902 configured to control the buoyancy of the buoy. For example, the buoyancy system 902 may change the effective density of the buoy. The density of any object is determined by its mass divided by its volume. The buoy 900 may keep its mass constant, but altering its volume changes its density. To achieve this, for example, a hydraulic piston may be used to push, e.g., mineral oil out of the buoy and expand a rubber bladder at the bottom end of the buoy. As the bladder expands, the buoy becomes less dense than the seawater and rises to the surface. Upon being launched from the launching vessel, the buoy withdraws the piston and descends to the desired depth to record seismic signals.

This is one example for controlling the buoyancy of the buoy. Those skilled in the art would appreciate that other systems may be employed for controlling the buoyancy of the buoy. In one application, the buoyancy system may include a motor and a propeller to further control the speed and direction of the buoy.

Further, the buoy 900 may include one or more sensors 904, e.g., a pressure gauge, for determining the pressure and/or temperature of the ambient of the buoy, etc. A processor 906 may be connected to the sensors 904 and the buoyancy system 902 for coordinating the up and down movement of the buoy. The processor 906 may also be configured to control the vertical speed of the buoy by controlling the buoyancy of the buoy. For example, the processor may be configured to achieve a first speed for a shallow depth and a second speed for higher depths. Also, the processor 906 may calculate the depth of the buoy based on the pressure readings from the sensor 904.

The processor 906 may also be connected to a battery 908, a high-accuracy oscillator or clock module 910, e.g., a temperature-controlled crystal oscillator (TCXO), a data storage device 912 for storing the recorded seismic data, an inertial device 914, a GPS 916 and a corresponding antenna 916*a*, and an RF beacon 918 and a corresponding antenna 918*a*, etc. The battery 908 may be any known battery. The module 910 is configured to provide an accurate time to the processor 906 for correctly time-stamping the recorded seismic data. In one application, the module 910 is configured to sample every 2 ms the acoustic signal and time-stamp it. The module 910 may also record a compass direction. Based on the temperature sensor, the module 910 may adjust/correct its oscillating time to provide an accurate time as the water temperature is changing.

The optional inertial device 914 may be an inexpensive inertial navigation system (INS). An inertial navigation system includes at least a module containing accelerometers, gyroscopes or other motion-sensing devices. The INS is initially provided with the position and velocity of the buoy from another source, for example, a human operator, the GPS 916, etc., and thereafter the INS may compute its own updated position and velocity by integrating information received from its motion sensors. The advantage of an INS is that it requires no external references in order to determine its position, orientation or velocity once it has been initialized. Further, usage of the INS is inexpensive. However, in the exemplary embodiment discussed herein, the position of the buoy is determined using the pingers of the vessels discussed above.

The buoy 900 may also include the RF beacon 918, which is configured to send RF signals such that a vessel can locate the buoy. The processor 906 is configured to activate the RF beacon 918 when the buoy is at the surface of the water, or the antenna 918*a* is capable of transmitting the RF signals to a vessel. Those skilled in the art would recognize that the buoy may include other equipment that helps the navigation. However, it is desirable to provide an inexpensive buoy and, for this reason, the equipment added to the buoy should be kept to a minimum.

In terms of seismic equipment, the buoy 900 may include one or more seismic sensors 920. Such a sensor may be at least one of a hydrophone, geophone, accelerometer, electromagnetic sensor, etc. In one application, the seismic sensor includes only a hydrophone. In another application, the seismic sensor includes a hydrophone and three geophones. Once the buoy has reached the desired depth, the buoy stabilizes its position by performing, for example, a control loop between the buoyancy control system and the pressure gauge. Additionally, the buoy 900 may include an acoustic signal conditioning module 922. This module is configured to process the acquired seismic signals, for example, to apply various filters to the recorded seismic signals.

The embodiments discussed above have assumed that the water currents are minimal or non-existing and, thus, the buoy maintains its position in a plane substantially parallel to the water surface without additional devices. However, if there are some underwater currents (not strong currents) that need to be taken into account, the next exemplary embodiment explains how to address this matter. Still with regard to FIG. 9, the buoy 900 may include a propulsion system 930. At a minimum, the propulsion system 930 may include a motor 932 and a propeller 934. The propeller 934 is show in the figure configured to move the node on a vertical direction Z. However, the propeller 934 or additional propellers may be oriented to provide movement in the XY plane (horizontal positioning) for the buoy 900. Thus, the buoy would have a dynamic control to stay at its position, e.g., a propulsion system capable to adjust the position of the node in the XY plane and a buoyancy control for its depth. The processor 906 may be connected to the propulsion system 930 for dynamically maintaining the position of the buoy, when deployed, at the desired target position. More specifically, if a trajectory is desired to be followed by the buoy in the presence of underwater currents, the propulsion system may adjust the position of the buoy to follow the desired trajectory. Alternatively, if the buoy is desired to be kept fixed at a given position for recording seismic data, the propulsion system is configured to maintain that position, i.e., to compensate for the motion of the buoy due to the water currents so that overall the buoy is motionless.

To maintain the target position, the buoy may have a system (e.g. acoustic system, USBL (to be discussed later), pressure gauge, etc.) which permits them to know where they are and control their position.

FIG. 9 also shows a communication interface 940 that is capable of exchanging data with a system on the vessel, for transferring the recorded seismic data when the buoy is retrieved on the vessel. The communication interface 940 may be wired or wireless, e.g., a wi-fi interface. Other known types of wireless interfaces may be used.

Figure 10:
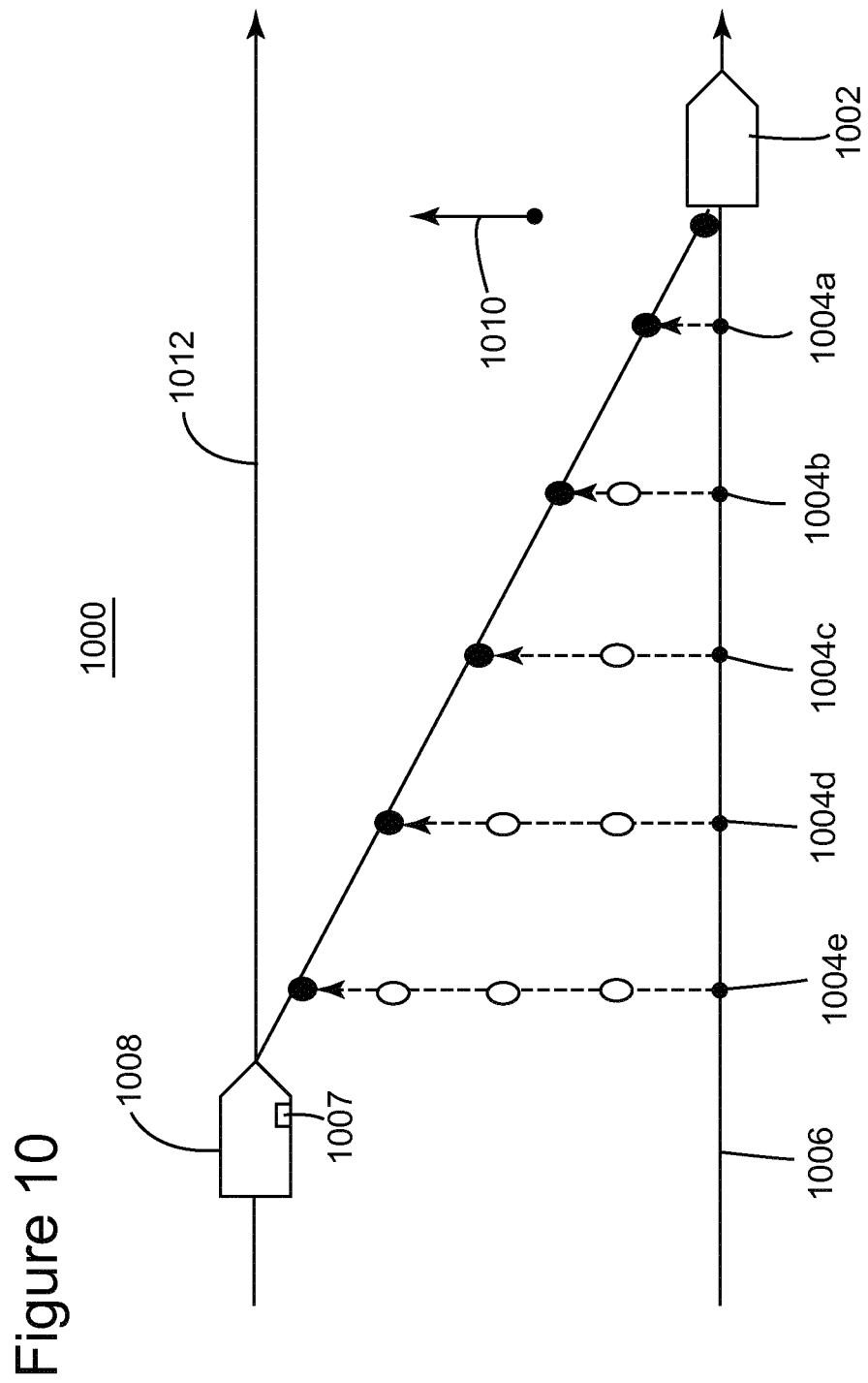
FIG. 10 is a schematic diagram of a seismic survey system configured to take into consideration lateral currents when recovering buoys according to an exemplary embodiment.

FIG. 10 shows a top view of a system 1000 in which the launching vessel 1002 launches buoys 1004a-e along a predetermined path 1006. A real-time map of the buoys may be achieved by using the pingers of the vessels. Thus, a controller 1007 provided on the recovery vessel 1008, or on the launching vessel 1002, or distributed on both vessels, may calculate how strong the underwater currents 1010 are and may instruct the recovery vessel 1008 to take a path 1012 to correctly intercept the resurfacing buoys.

Figure 11:
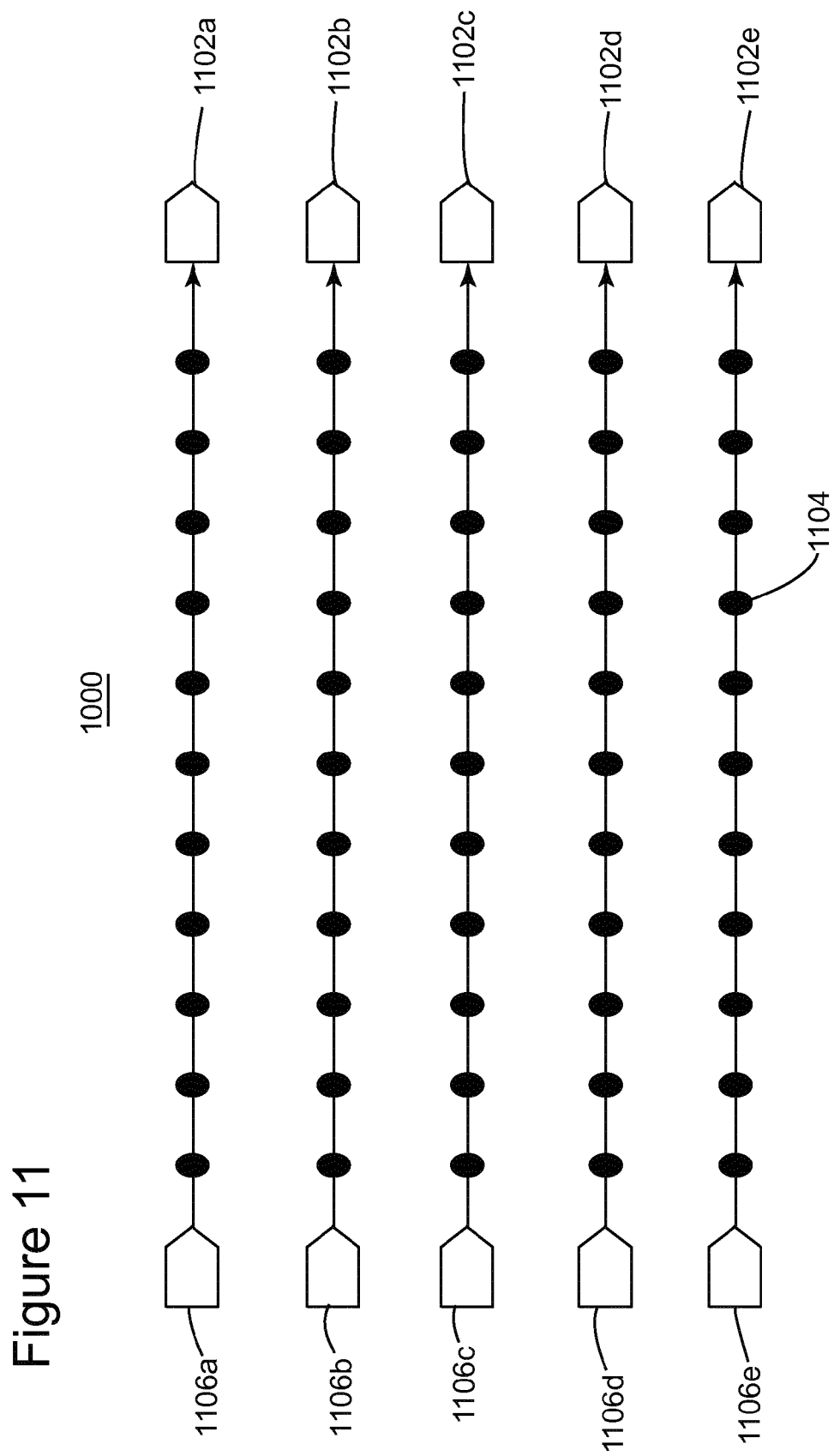
FIG. 11 is a schematic diagram of a seismic survey system that includes plural launching vessels and plural recovery vessels according to an exemplary embodiment.

The buoys may also be used to perform a 3D seismic survey as shown in FIG. 11. The system 1100 may include plural launching vessels 1102a-e and corresponding plural recovery vessels 1106a-e. Buoys 1104 are launched by each launching vessel and recovered by the corresponding recovery vessel as explained in the previous embodiments. Source vessels may be used to obtain a wide azimuth seismic survey. Thus, such a system may work similarly to a conventional system in which a vessel tows multiple streamers. In this case, a "streamer" is formed by the buoys between the launching vessel and the recovery vessel.

However, the system shown in FIG. 11 is cheaper than the conventional streamer system because the vessels used to launch and recover the buoys are not as sophisticated as the vessel that tows the streamers, there is no drag produced by the buoys on the vessel, and the buoys themselves are cheaper than the streamers. In addition, the present system obtains more diversified data, the seismic receivers on the buoys reach a greater depth than the current depths achieved by the streamers, and the flow noise is minimized or entirely suppressed because the speed of the buoy during data acquisition is substantially zero.

In addition, because the flow noise present in the case of the real streamers is absent in the present design, the speed of the launching and recovery vessels may be increased above the conventional 5 knots per hour used in streamer-based seismic surveys. This decreases the time necessary for completing the survey, which results in a reduced cost for renting and operating the equipment, and also reduces personnel expenses. Further, the present system may be deployed near obstructed areas, e.g., next to drilling platforms, etc. Not the least, the data recorded with the present system achieves the highest notch diversity, which is desirable for data deghosting.

However, if the underwater currents are significant, the above-discussed embodiments pose a challenge to the recovery vessel when recovering the buoys because the buoys may spread beyond a desired range. Thus, according to another exemplary embodiment, the high underwater currents may be used to the advantage of the seismic survey as now discussed.

Figure 12:
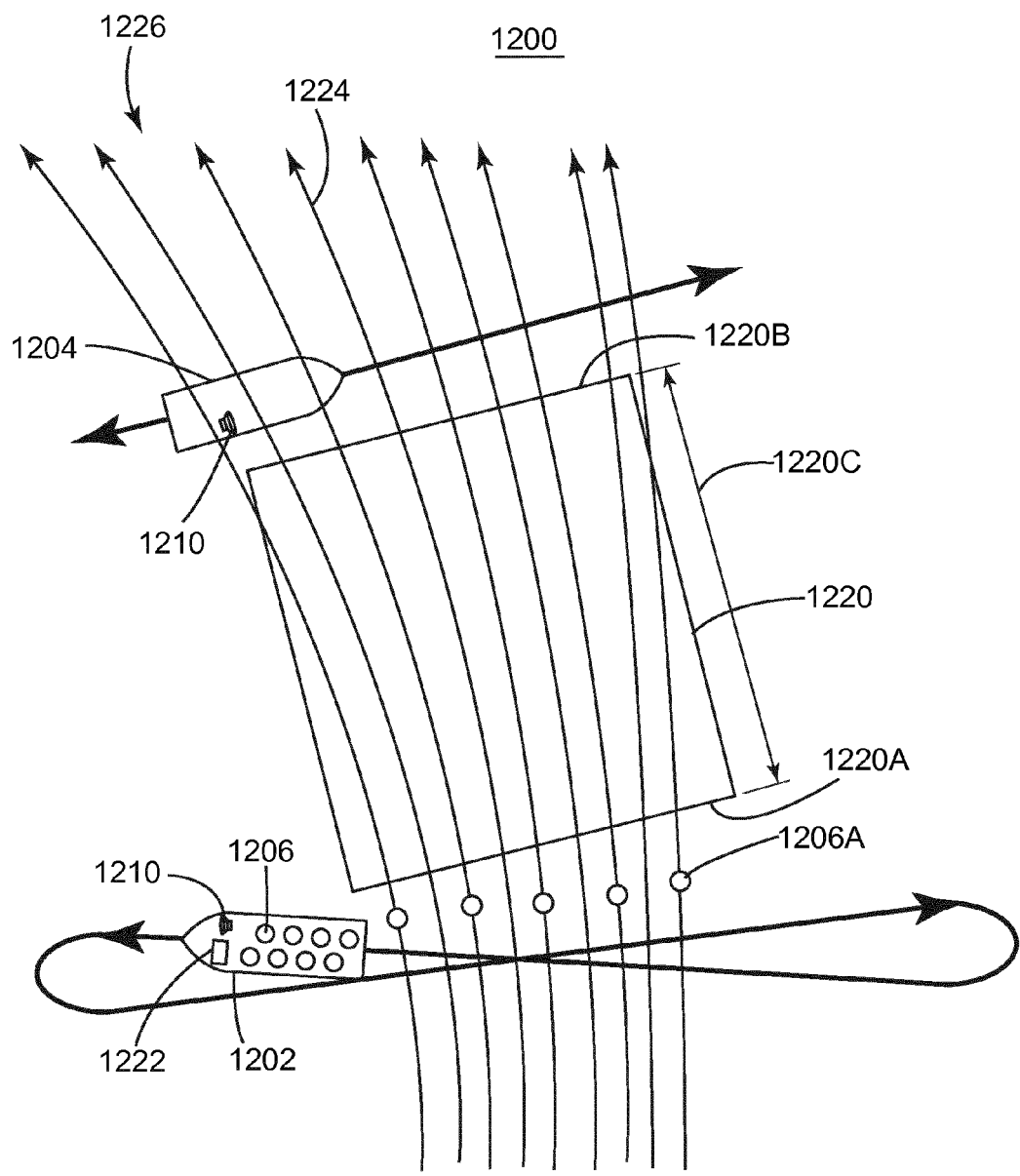
FIGS. 12-15 are schematic diagrams of another seismic survey system according to an exemplary embodiment.

As illustrated in FIG. 12, a system 1200 includes a launching vessel 1202, a recovery vessel 1204, and plural buoys 1206. The vessels may be equipped with an acoustic system 1210 for tracking the position of the buoys when underwater. An exemplary acoustic system is described next, and this system can track the buoy with an accuracy of approximately 5 m at a distance in the order of kilometers.

The acoustic system 1210 may be an Ultra-short baseline (USBL) system, also sometimes known as Super Short Base Line (SSBL). This system uses a method of underwater acoustic positioning. A complete USBL system includes a transceiver, which is mounted on a pole under a vessel, and a transponder/responder on the buoy. A processor is used to calculate a position from the ranges and bearings measured by the transceiver. For example, an acoustic pulse is transmitted by the transceiver and detected by the subsea transponder, which replies with its own acoustic pulse. This return pulse is detected by the transceiver on the vessel. The time from the transmission of the initial acoustic pulse until the reply is detected is measured by the USBL system and is converted into a range. To calculate a subsea position, the USBL calculates both a range and an angle from the transceiver to the subsea buoy. Angles are measured by the transceiver, which contains an array of transducers. The transceiver head normally contains three or more transducers separated by a baseline of, e.g., 10 cm or less.

FIG. 12 also shows a seismic survey area 1220 that is desired to be surveyed with the buoys 1206. Based on various data (e.g., historic data) available for the underwater currents corresponding to the area 1220, a current model is developed through computer calculations in a computer system 1222. The output of these computer calculations is a number of current paths/trajectories 1224. Thus, a current map 1226 may be developed for the area 1220 of interest. Alternatively or in addition, the current map 1226 may be generated by using the positions of the buoys 1206. For example, as the buoys 1206 travel for some time, the acoustic system 1210 may monitor their positions and based on this information, infer the current map. With this capability, the current map may be updated while the seismic survey is performed and, thus, the trajectories of the buoys may be updated. Consequently, the line 1220B where the vessel 1204 waits to retrieve the buoys may change during the survey. With this information, the survey is designed so that the buoys are launched at a side (line) 1220A of the area 1220 of interest such that the underwater current 1224 would take the buoys to the opposite side (line) 1220B of the area 1220. Thus, a course/trajectory of the launching and/or recovery vessels may be substantially perpendicular on the trajectories of the underwater currents.

A distance 1220C travelled by the buoys may be in the order of kilometers, e.g., 20 to 30 km. In other words, the buoys are expected in this embodiment to travel along the current 1224, from one side 1220A of the survey area 1220 to an opposite side 1220B of the survey area 1220.

Figure 13:
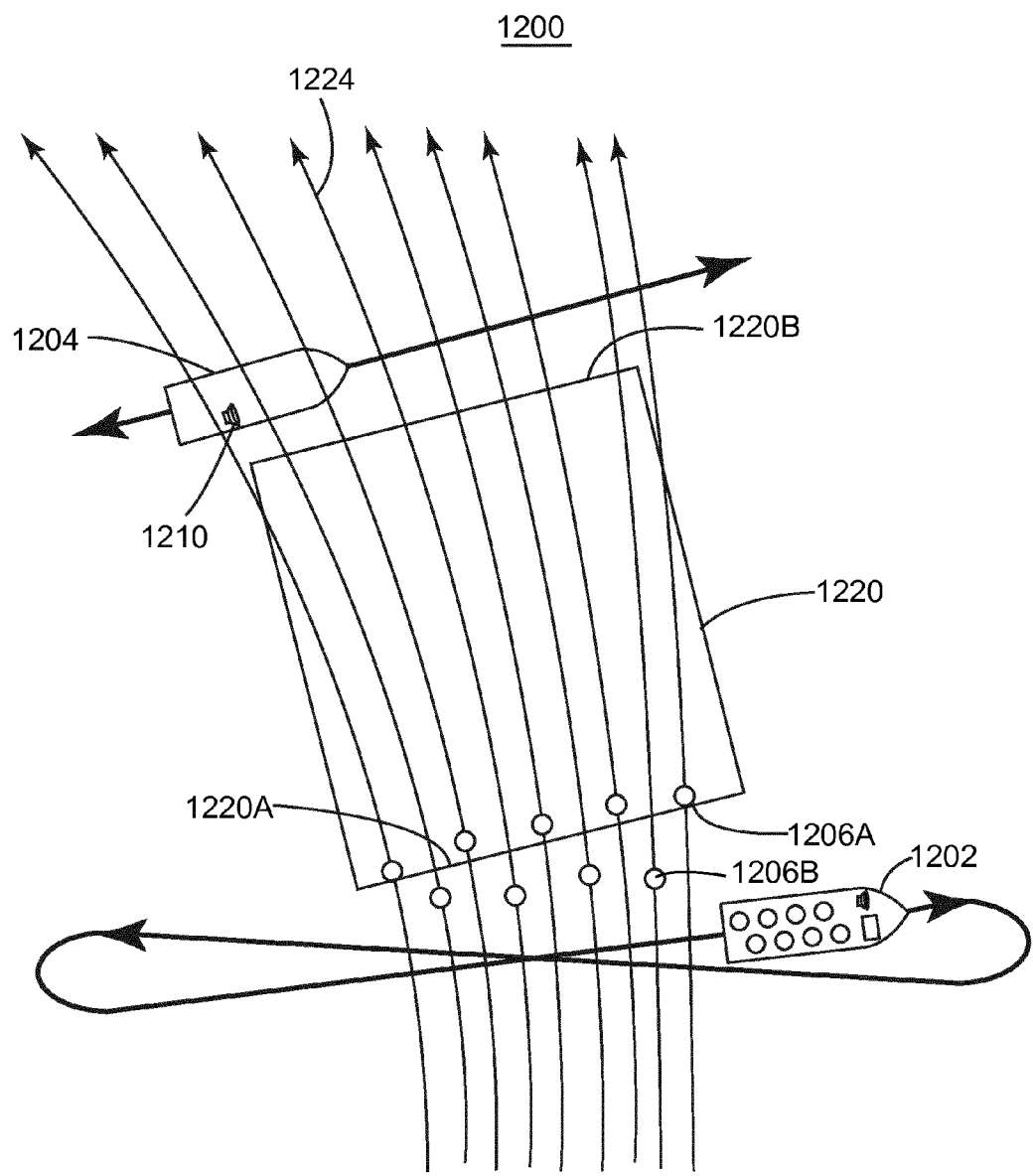
Figure 14:
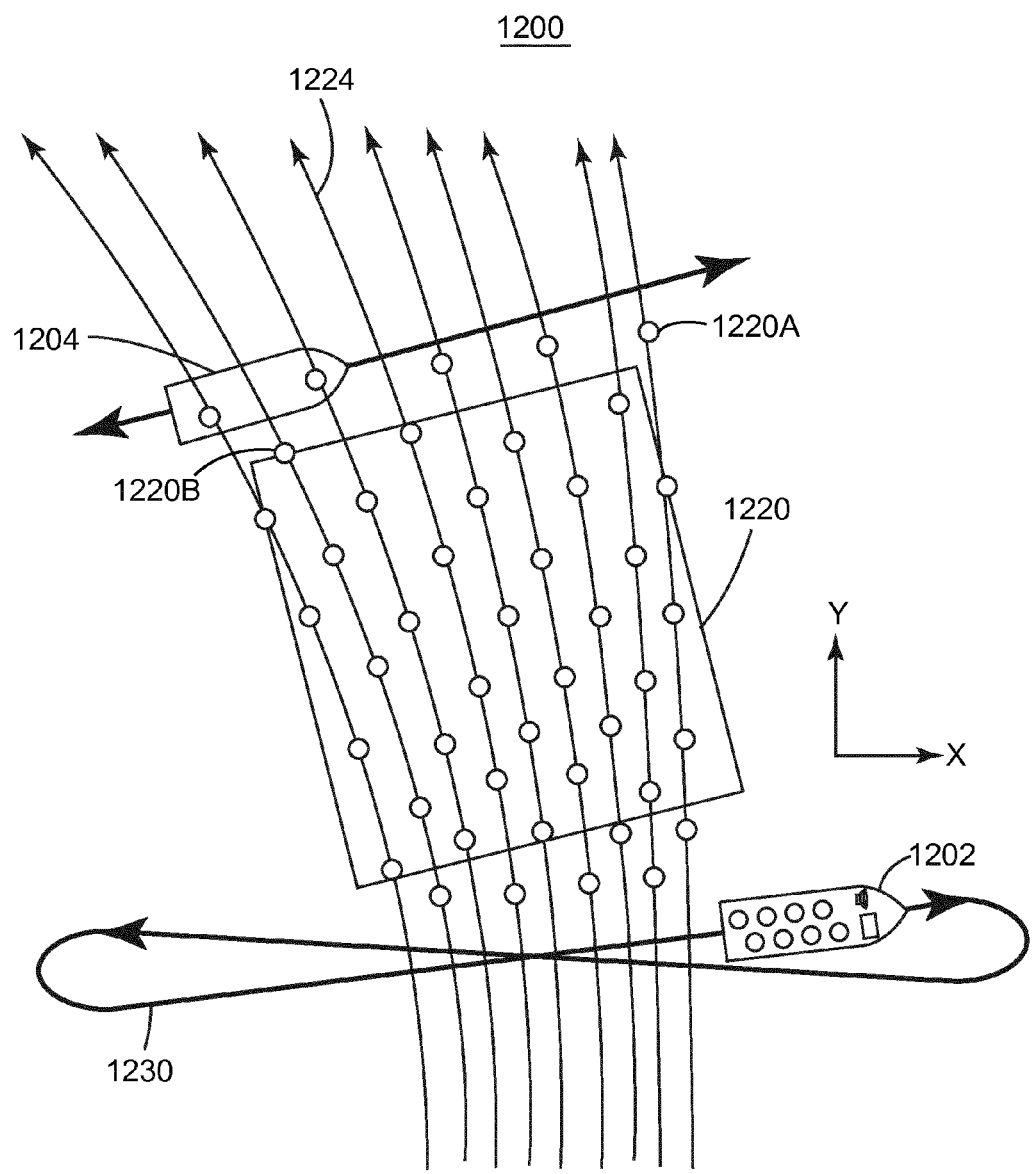

Thus, for such an arrangement, the launching vessel is instructed to travel back and forth along the first side 1220A and to launch a first set of buoys 1206A at a first pass, a second set of buoys 12068 at a second pass (later in time) as shown in FIG. 13, and so on until a desired number of buoys has been launched as shown in FIG. 14. It is noted in these figures the path 1230 followed by the launching vessel and how the buoys are spaced along an X direction at a desired first distance and along a Y direction at a desired second distance. FIG. 14 also shows how the first set of buoys 1220A has reached the recovery vessel 1204. It is noted that the buoys 1220 are distributed underwater similar to the embodiment shown in FIG. 4, with the exception that in that embodiment the buoys are almost stationary, while in FIGS. 12-14 the buoys travel underwater, up to tens of kilometers as required by the survey. For example, for a current of 700 m/h as might be in the Gulf of Mexico, a buoy may travel along the current 1224 for 84 km in five days. Further, the buoys may be configured to attain different depths, e.g., a first wave of buoys may float at a first depth H1 and a second wave of buoys may float at a second depth H2. In another application, the depths of the successive waves may increase up to a point so that the array of buoys resembles plural streamers having a depth-varying profile. The depth-varying profile may be a slanted line or a parameterized curve. In one application, the depth-varying profile extends parallel with lines 1220A and/or 1220B while in another application the depth-varying profile extends parallel with distance 1220C.

Figure 15:
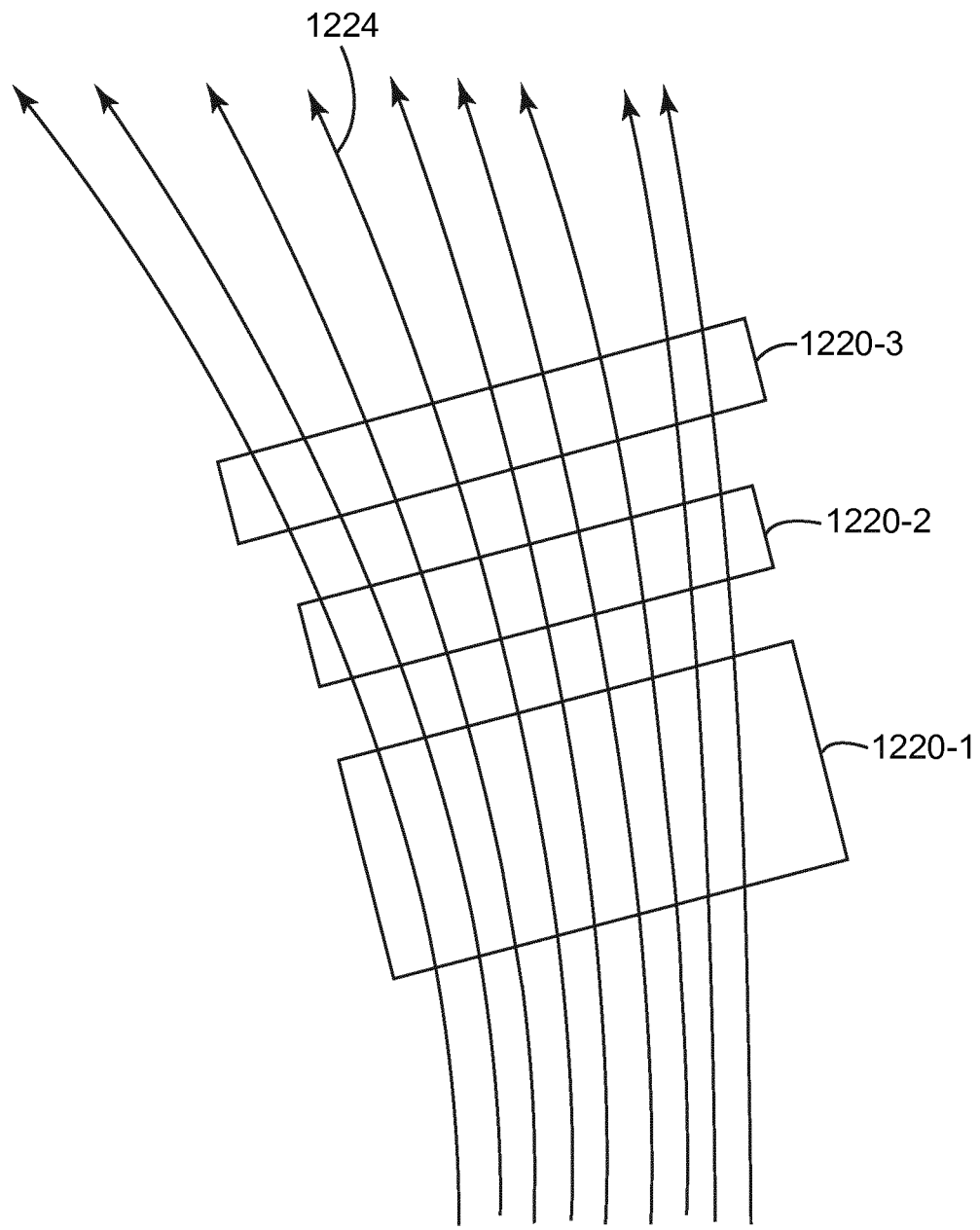

If there is a desire to limit the spread of the buoys over the X axis, the survey may be divided into smaller areas (rectangles or other shapes) 1220-1 to 1220-3 as shown in FIG. 15, and each smaller area may be surveyed as shown in FIGS. 12-14. Alternatively, the buoys may be provided with the propulsion system discussed above and it may be used to prevent the spread of the buoys. Once the survey of one area is finalized, the recovery vessel may become the launching vessel and the former launching vessel moves to the end of the second area to restart the recovery for the survey.

Figure 16:
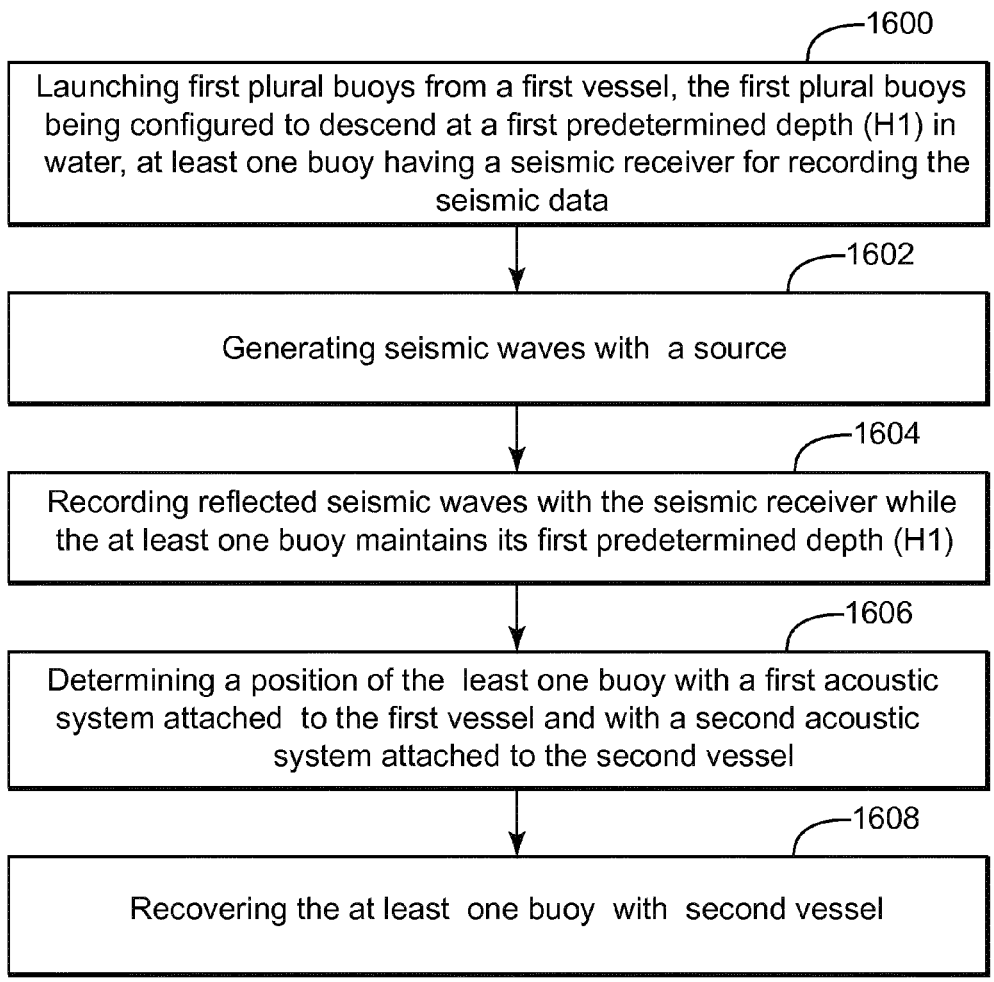
FIG. 16 is a flowchart of a method for performing a seismic survey with substantially stationary buoys according to an exemplary embodiment.

The above-discussed embodiments may be implemented as methods as now discussed. According to an exemplary embodiment illustrated in FIG. 16, there is a method for recording seismic data underwater with a seismic survey system. The method includes a step 1600 of launching first plural buoys from a first vessel, the first plural buoys being configured to descend at a first predetermined depth (H1) in water, at least one buoy (210) having a seismic receiver for recording the seismic data; a step 1602 of generating seismic waves with a source; a step 1604 of recording reflected seismic waves with the seismic receiver while the at least one buoy maintains its first predetermined depth (H1); a step 1606 of determining a position of the at least one buoy with a first acoustic system attached to the first vessel and with a second acoustic system attached to the second vessel; and a step 1608 of recovering the at least one buoy with the second vessel. The at least one buoy is instructed to stay at the first predetermined depth (H1) underwater while recording the seismic data.

Figure 17:
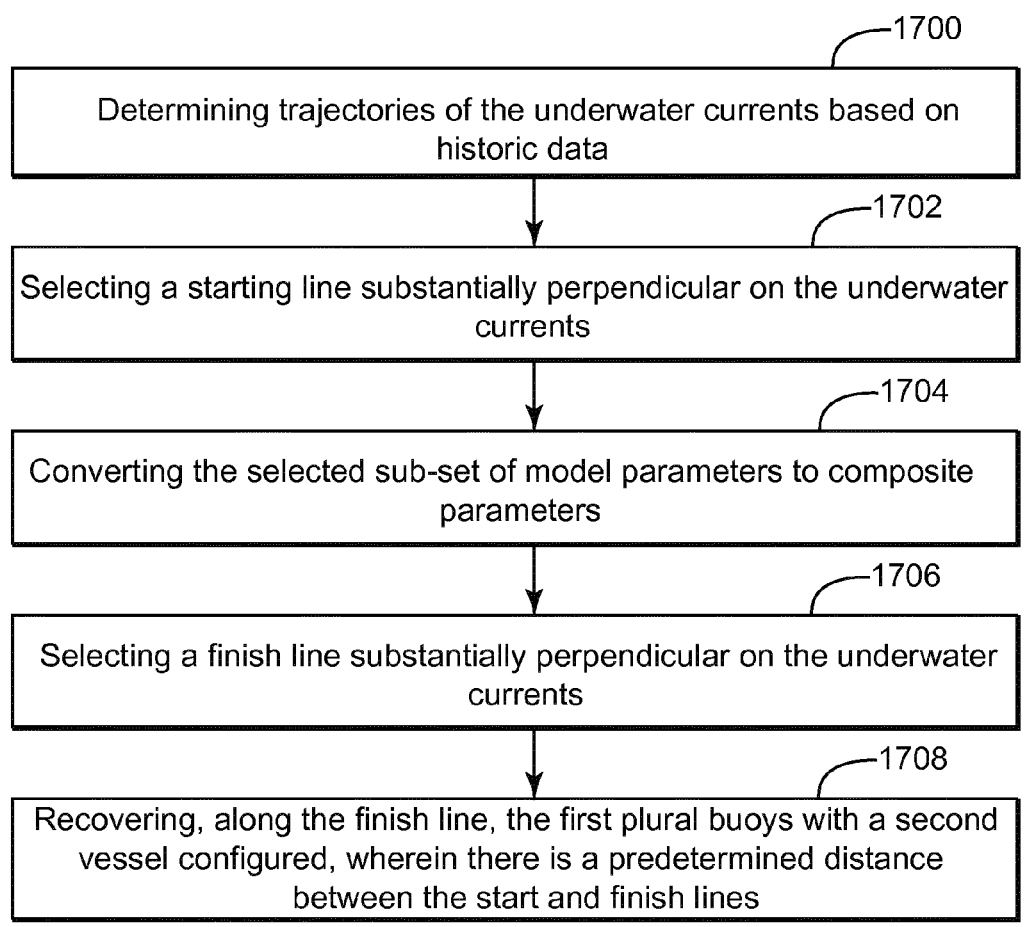
FIG. 17 is a flowchart of a method for performing a seismic survey with moving buoys according to an exemplary embodiment.

According to another exemplary embodiment illustrated in FIG. 17, there is a method for recording seismic data underwater in the presence of underwater currents. The method includes a step 1700 of determining trajectories of the underwater currents based on historic data; a step 1702 of selecting a starting line substantially perpendicular on the underwater currents; a step 1704 of launching, along the starting line, first plural buoys from a first vessel, the first plural buoys being configured to descend in water and each having a seismic receiver for recording the seismic data; a step 1706 of selecting a finish line substantially perpendicular on the underwater currents; and a step 1708 of recovering, along the finish line, the first plural buoys with a second vessel configured, wherein there is a predetermined distance between the start and finish lines. The first plural buoys are configured to travel underwater, at substantially a first predetermined depth (H1), from the start line to the finish line, due to the underwater currents.

The systems and processes discussed above are just some examples for illustrating the novel concepts of using buoys for seismic data recording. Those skilled in the art would appreciate that these systems and/or processes may be changed, adjusted or modified to fit various needs. For example, the buoys may be replaced with similar devices that use no propelling means for reaching a desired depth.

In this regard, it is noted that it is known in the field to use autonomous underwater vehicles (AUV) for deploying seismic sensors. However, an AUV is different from a buoy in the sense that the buoy does not have a propulsion system, i.e., motor and associated propeller or water pump. Another difference between existing AUVs and the present buoys is that AUVs travel to the seabed and back without recording seismic data. Conventional AUVs land on the seabed and make some seismic recordings while stationary, after which they return to the surface.

One or more of the exemplary embodiments discussed above disclose a buoy configured to perform seismic recordings. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A seismic survey system for recording seismic data underwater in the presence of underwater currents, the system comprising:

first plural buoys configured to descend in water at a predetermined depth (H1), at least one buoy having a seismic receiver for recording the seismic data, a buoyancy system for maintaining the predetermined depth (H1), and a propulsion system for adjusting its horizontal position;

a first vessel configured to launch the first plural buoys along a first line; and a second vessel configured to recover the first plural buoys at a second line, wherein there is a predetermined distance between the first and second lines; and a computer system configured to calculate the underwater currents prior to launching the first plural buoys and to determine a position of the second line, wherein the computer system calculates the underwater currents based on historic data, wherein the computer system is configured to receive current positions of the first plural buoys, and to calculate new trajectories of the underwater currents based on the current positions of the first plural buoys, and wherein the first plural buoys are configured to travel underwater, at substantially the first predetermined depth (H1), from the first line to the second line, due to a combination of the underwater currents and the propulsion system.

2. The system of claim 1, wherein the first vessel is configured to launch second plural buoys along the first line, later in time than the first plural buoys.

3. The system of claim 2, wherein the first vessel is configured to launch waves of buoys to cover a desired area for collecting the seismic data.

4. The system of claim 2, wherein the second vessel is configured to move back and forth along the second line to recover the second plural buoys.

5. The system of claim 1, wherein the predetermined distance is larger than 10 km.

6. The system of claim 1, further comprising:
second plural buoys configured to descend to a second predetermined depth in water.

7. The system of claim 1, further comprising:
second plural buoys configured to descend in water to form a variable-depth profile.

8. A method for recording seismic data underwater in the presence of underwater currents, the method comprising:
determining trajectories of the underwater currents based on historic data;
selecting a starting line substantially perpendicular to the underwater currents;
launching, along the starting line, first plural buoys from a first vessel, the first plural buoys being configured to descend in water, at least one buoy having a seismic receiver for recording the seismic data, a buoyancy system for maintaining the predetermined depth (H1), and a propulsion system for adjusting its horizontal position;
selecting a finish line substantially perpendicular on the underwater currents; and
retrieving, along the finish line, the first plural buoys on a second vessel, wherein there is a predetermined distance between the start and finish lines,
wherein the first plural buoys are configured to travel underwater, at substantially the first predetermined depth (H1), from the start line to the finish line, due to a combination of the underwater currents and the propulsion system.

9. The system of claim 1, further comprising:
a first acoustic system attached to the first vessel and configured to detect a position of the at least one buoy while underwater; and
a second acoustic system attached to the second vessel and configured to detect the position of the least one buoy while underwater.

10. The system of claim 9, wherein each of the first and second acoustic systems includes at least two acoustic pingers, each pinger being configured to emit an acoustic wave with a unique frequency.

11. The method of claim 8, wherein the first vessel is configured to launch second plural buoys along the starting line, later in time than the first plural buoys.

12. The method of claim 11, wherein the first vessel is configured to launch waves of buoys to cover a desired area for collecting the seismic data.

13. The method of claim 11, wherein the second vessel is configured to move back and forth along the finish line to recover the second plural buoys.

14. The method of claim 11, wherein the second plural buoys descend to a second predetermined depth in water.

15. The method of claim 11, wherein the second plural buoys descend in water to form a variable-depth profile.

16. The method of claim 8, wherein the predetermined distance is larger than 10 km.

17. The method of claim 8, wherein a computer system calculates the underwater currents prior to launching the first plural buoys and determines a position of the finish line.

18. The method of claim 8, wherein the computer system receives current positions of the first plural buoys, and calculates new trajectories of the underwater currents based on the current positions of the first plural buoys.

* * * * *